(12) United States Patent
Sato et al.

(10) Patent No.: US 8,348,272 B2
(45) Date of Patent: Jan. 8, 2013

(54) SHEETS COUNTING DEVICE

(75) Inventors: Tomoyasu Sato, Hyogo (JP); Toshihiko Suzuki, Hyogo (JP)

(73) Assignee: Glory Ltd., Himeji-shi (JP)

( * ) Notice: Subject to any disclaimer, the term of this patent is extended or adjusted under 35 U.S.C. 154(b) by 240 days.

(21) Appl. No.: 12/446,390

(22) PCT Filed: Oct. 24, 2006

(86) PCT No.: PCT/JP2006/321595
§ 371 (c)(1),
(2), (4) Date: Apr. 20, 2009

(87) PCT Pub. No.: WO2008/050461
PCT Pub. Date: May 2, 2008

(65) Prior Publication Data
US 2010/0320674 A1    Dec. 23, 2010

(51) Int. Cl.
*G07F 1/04* (2006.01)
(52) U.S. Cl. .......................... 271/272; 194/344
(58) Field of Classification Search .................. 194/215, 194/344, 346, 347; 209/534, 699; 271/624, 271/272, 264
See application file for complete search history.

(56) References Cited

U.S. PATENT DOCUMENTS

| | | | | |
|---|---|---|---|---|
| 4,493,994 | A * | 1/1985 | Hilton ........................ | 250/223 R |
| 7,883,090 | B2 * | 2/2011 | Ito .................................. | 271/289 |
| 2001/0048069 | A1 * | 12/2001 | Sallen et al. ................... | 250/225 |
| 2004/0178562 | A1 * | 9/2004 | Graef et al. .................... | 271/119 |
| 2005/0006199 | A1 * | 1/2005 | Brugger et al. ............... | 194/347 |
| 2005/0053183 | A1 | 3/2005 | Abe et al. | |
| 2006/0181014 | A1 * | 8/2006 | Polidoro et al. .............. | 271/272 |

FOREIGN PATENT DOCUMENTS

| | | |
|---|---|---|
| JP | 61-44440 U | 3/1986 |
| JP | 63-27347 A | 2/1988 |
| JP | 1-10671 Y2 | 3/1989 |
| JP | 3-41375 U | 4/1991 |
| JP | 6-17178 B2 | 3/1994 |
| JP | 9-297869 A | 11/1997 |
| JP | 2001-22991 A | 1/2001 |
| JP | 2003-178348 A | 6/2003 |

* cited by examiner

*Primary Examiner* — Jeremy R Severson
(74) *Attorney, Agent, or Firm* — Foley & Lardner LLP

(57) ABSTRACT

A paper sheet counting apparatus includes a hopper; a transport mechanism that feeds the paper sheets to a transport path one by one, and transports the paper sheets along the transport path; a sensing unit including a counting sensor for counting the paper sheets; and a stacker. The transport mechanism includes a drive roller constituting an inside of a turn portion for changing a direction of the transport path; pinch rollers that biases the paper sheet against the drive roller; and a turn guide plate arranged between the pinch rollers to guide the paper sheet along an outer periphery of the drive roller. The turn guide plate is formed such that a front edge of the paper sheet transported to the turn portion is guided to a contact portion between a pinch roller arranged on a downstream side and the drive roller.

15 Claims, 9 Drawing Sheets

SHEETS COUNTING DEVICE

TECHNICAL FIELD

The present invention relates to a paper sheet counting apparatus that receives a plurality of paper sheets placed in a hopper, counts the number of sheets, and delivers the paper sheets to a stacker. More particularly, the present invention relates to a paper sheet counting apparatus improved so that noise and jamming of the paper sheets caused at the time of transporting the paper sheets can be prevented.

BACKGROUND ART

The paper sheet counting apparatus that receives paper sheets (bills and the like) of different types (denominations and the like) collectively in the hopper, feeds and transports the paper sheets one by one into the apparatus, and counts and displays the number of sheets for each type and the total number of sheets (in the case of bills, the number of sheets per denomination and the total amount) has been conventionally known (for example, see Japanese Patent Application Laid-open No. 2003-178348).

FIG. 1 is a schematic explanatory diagram of an internal structure of a general paper sheet counting apparatus. In FIG. 1, a paper sheet counting apparatus 1 includes a hopper 3 into which specific bills, which are paper sheets to be counted, are loaded, on an upper front of a casing 2. The bills filled in a stacked state in the hopper 3 are fed to a feeding mechanism 5 including a plurality of rollers by a kicker roller 4, and fed to a transport path 6 one by one by the feeding mechanism 5.

Passage sensors 8a, 8b, and 8c that detect a traveling state such as a skew degree of the bills being transported, and a counting and recognition sensor 8d for counting and recognizing the bills are provided along the way of the transport path 6, in addition to a plurality of drive rollers 7 and a drive roller 7a forming an inside of a turn portion. Determination of authenticity and denomination of the bills is performed by the counting and recognition sensor 8d, so that the number of sheets and the amount of the bills are counted. The bill determined to be a counting target by detection by the counting and recognition sensor 8d is received between blades of a rotating impeller 9, and aligned and stacked in a stacker 10. On the other hand, the bill excluded from the counting target by detection by the counting and recognition sensor 8d is delivered to a rejecting unit 13, due to downward swinging of a flipper 12 by an operation of a solenoid 11.

Such a paper sheet counting apparatus 1 needs to be formed in a compact shape, and therefore, the transport path 6 is a curved path having the turn portion for changing a transport direction of the paper sheets (bills) along the way. If there is a large difference in level in the turn portion of the transport path 6, the paper sheets being transported may come in contact with the difference, thereby causing running noise, and a front edge of the paper sheet may be damaged (for example, see Japanese Patent Application Laid-open No. H9-297869).

FIG. 2 is an enlarged diagram of a part circled with a dotted line II (the turn portion of the transport path 6) in FIG. 1. In FIG. 2, a drive roller 7A constituting the inside of the turn portion, and a first pinch roller 7B and a second pinch roller 7C that biases a transported paper sheet P against an outer peripheral surface of the drive roller 7A are provided in the turn portion of the transport path 6. A turn guide plate 15 is arranged along a circumference of the drive roller 7A between the first pinch roller 7B and the second pinch roller 7C, so that the paper sheet P is guided from a contact area C1 between the first pinch roller 7B and the drive roller 7A to a contact area C2 between the second pinch roller 7C and the drive roller 7A.

However, in the turn portion of the conventional paper sheet counting apparatus 1 as shown in FIG. 2, the paper sheet P having passed the first pinch roller 7B with the transport direction being changed by the turn guide plate 15 proceeds along an inner peripheral surface of the turn guide plate 15, and runs into the second pinch roller 7C with a part thereof protruding from the inner peripheral surface of the turn guide plate 15 at a large incident angle. Therefore, in the conventional paper sheet counting apparatus 1, there is large noise generated due to the contact between the front edge of the bill P and the second pinch roller 7C, thereby causing a running noise problem. Further, there may be damage of the front edge of the bill P such as folding due to the contact, thereby causing a problem in that high transport speed cannot be realized.

In the paper sheet counting apparatus 1 of this type, for example, at the time of counting sales proceeds of a shop, the bill taken out from a sales bag or the like may be filled in the hopper 3. In this case, a coin may be put between the bills. If the bills are filled in the hopper 3 in such a state, not only the bill but also the coin may be fed to the transport path 6.

However, the conventional paper sheet counting apparatus 1 does not have a structure for preventing approach of a thin and hard foreign article (coin or the like) other than the paper sheets. Further, since the transport path 6 has substantially a linear shape, the foreign article such as the coin fed to the transport path 6 reaches the counting and recognition sensor 8d, which may damage the counting and recognition sensor 8d. Since the counting and recognition sensor 8d requires higher accuracy than the skew sensors 8a, 8b, and 8c, even a trivial flaw may cause a problem in the accuracy. Further, since the counting and recognition sensor 8d is a relatively expensive part, exchange thereof causes a cost increase.

In view of the above circumstances, an object of the present invention is to provide a paper sheet counting apparatus in which a configuration of a transport mechanism is improved so that noise at the time of transporting the paper sheets is suppressed, and even if a thin and hard foreign article such as a coin is fed to the transport path, a relatively expensive counting and recognition sensor is not damaged.

DISCLOSURE OF INVENTION

A paper sheet counting apparatus according to an aspect of the present invention includes a hopper in which a plurality of paper sheets are filled in a stacked state; a transport mechanism that feeds the paper sheets filled in the hopper to a transport path one by one, and transports the paper sheets along the transport path; a sensing unit including at least a counting sensor for counting the paper sheets; and a stacker in which the paper sheets fed from the transport path are stacked. The transport mechanism includes a drive roller constituting an inside of a turn portion for changing a direction of the transport path; a plurality of pinch rollers that bias the paper sheet against an outer peripheral surface of the drive roller; and a turn guide plate arranged between the pinch rollers to guide the paper sheet along an outer periphery of the drive roller. The turn guide plate is formed such that a front edge of the paper sheet transported to the turn portion is guided to a contact portion between a pinch roller arranged on a downstream side among the pinch rollers and the drive roller.

In the paper sheet counting apparatus, the turn guide plate may include a concave portion near the pinch roller arranged on the downstream side.

A paper sheet counting apparatus according to another aspect of the present invention includes a hopper in which a plurality of paper sheets are filled in a stacked state; a transport mechanism that feeds the paper sheets filled in the hopper to a transport path one by one, and transports the paper sheets along the transport path; a sensing unit including at least a counting part for counting the paper sheets and a recognizing part for recognizing the paper sheets; and a stacker in which the paper sheets fed from the transport path are stacked. The transport path includes a bent portion formed on an upstream side of the counting part and the recognizing part so that a thin and hard foreign article other than the paper sheets cannot pass therethrough.

A paper sheet counting apparatus according to still another aspect of the present invention includes a hopper in which a plurality of paper sheets are filled in a stacked state; a transport mechanism that feeds the paper sheets filled in the hopper to a transport path one by one, and transports the paper sheets along the transport path; a sensing unit including at least a counting part for counting the paper sheets and a recognizing part for recognizing the paper sheets; and a stacker in which the paper sheets fed from the transport path are stacked. The transport mechanism includes a drive roller constituting an inside of a turn portion for changing a direction of the transport path; a plurality of pinch rollers that bias the paper sheet against an outer peripheral surface of the drive roller; and a turn guide plate arranged between the pinch rollers to guide the paper sheet along an outer periphery of the drive roller. The turn guide plate is formed such that a front edge of the paper sheet transported to the turn portion is guided to a contact portion between a pinch roller arranged on a downstream side among the pinch rollers and the drive roller. The transport path includes a bent portion formed on an upstream side of the counting part and the recognizing part so that a thin and hard foreign article other than the paper sheets cannot pass therethrough.

In the paper sheet counting apparatus, a relation between a height A of space of the transport path in the bent portion and an angle of bend θ of the transport path in the bent portion may be defined, as D denotes a width of the foreign article in a traveling direction, and T denotes a thickness of the foreign article, by $A \leq [T+D/2 \times \tan(\theta/2)] \times \cos(\theta/2)$.

In the paper sheet counting apparatus, the foreign article may be a circular member, and a diameter of the circular member may be equal to or larger than 16.25 millimeters, and a thickness of the circular member may be equal to or larger than 1.67 millimeters.

In the paper sheet counting apparatus, the transport path forming the bent portion may be capable of being open at least in either upward direction or downward direction.

According to the paper sheet counting apparatus of the present invention having the above-described configuration, the front edge of the paper sheet passing through the turn portion of the transport path travels along the inner peripheral surface of the turn guide plate provided outside of the drive roller. Therefore, when the front edge of the paper sheet enters into the contact portion between the pinch roller provided on the downstream side of the turn portion and the drive roller, an incident angle thereof can be made substantially 0 degree. Accordingly, running noise generated due to the contact between the front edge of the paper sheet and the pinch roller provided on the downstream side of the turn portion and damage of the front edge of the paper sheet can be reduced, thereby enabling to realize high transport speed.

Furthermore, since a concave portion is provided in the turn guide plate near the contact portion between the pinch roller provided on the downstream side of the turn portion and the drive roller, when the paper sheet passes through the contact portion, possibility of a corner at the front edge of the paper sheet being caught by a pinch roller hole bored for protruding the pinch roller from the inner peripheral surface of the turn guide plate can be reduced. As a result, troubles such as paper jamming can be reduced, and smooth transport of the paper sheets can be realized.

Further, according to the paper sheet counting apparatus of the present invention, a bent portion is provided in the transport path on an upstream side of a counting part and an recognizing part of a sensing unit so that a thin and hard foreign article other than the paper sheets cannot pass therethrough. The bent portion is formed only by parts invulnerable (or having no problem even if it is damaged) such as a guide plate. That is, the bent portion is provided at a position where a transport mechanism such as a roller is not arranged. Even if the foreign article such as a coin is mixed in the paper sheets filled in the hopper and fed to the transport path, the foreign article can be stopped by the bent portion provided on the upstream side of the counting part and the recognizing part. As a result, the counting part and the recognizing part in the sensing unit requiring high accuracy can be prevented from being damaged, and an exchange frequency of relatively expensive sensors used for the counting part and the recognizing part can be reduced. Further, since the bent portion is provided on the upstream side of the identifying part, disturbance light entering from an entrance of the transport path can be intercepted before the recognizing part, thereby enabling to favorably maintain the accuracy of various sensors in the recognizing part.

BEST MODE(S) FOR CARRYING OUT THE INVENTION

An embodiments of the present invention will be explained below with reference to the accompanying drawings.

Figure 1:
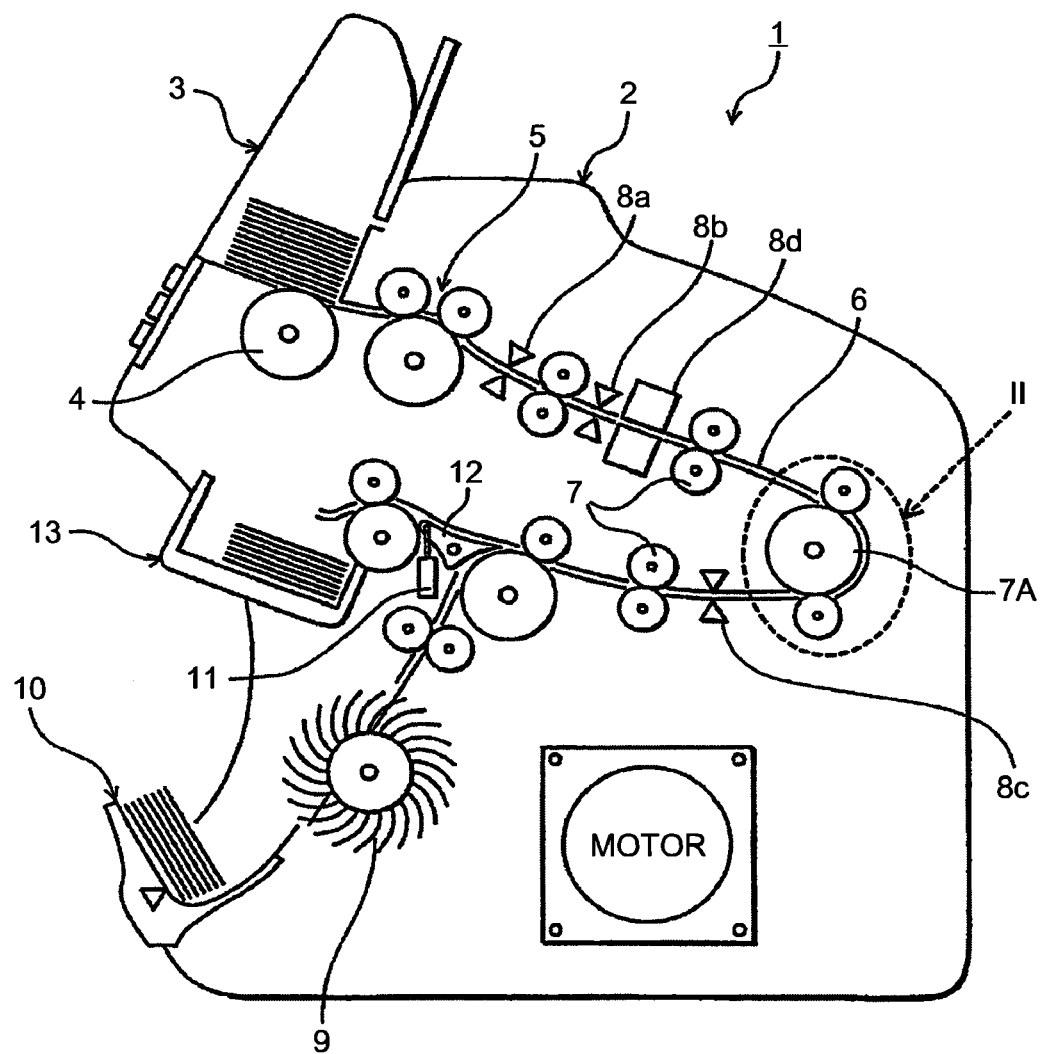
FIG. 1 is an explanatory diagram for schematically depicting a transport mechanism in a general paper sheet counting apparatus.
Figure 2:
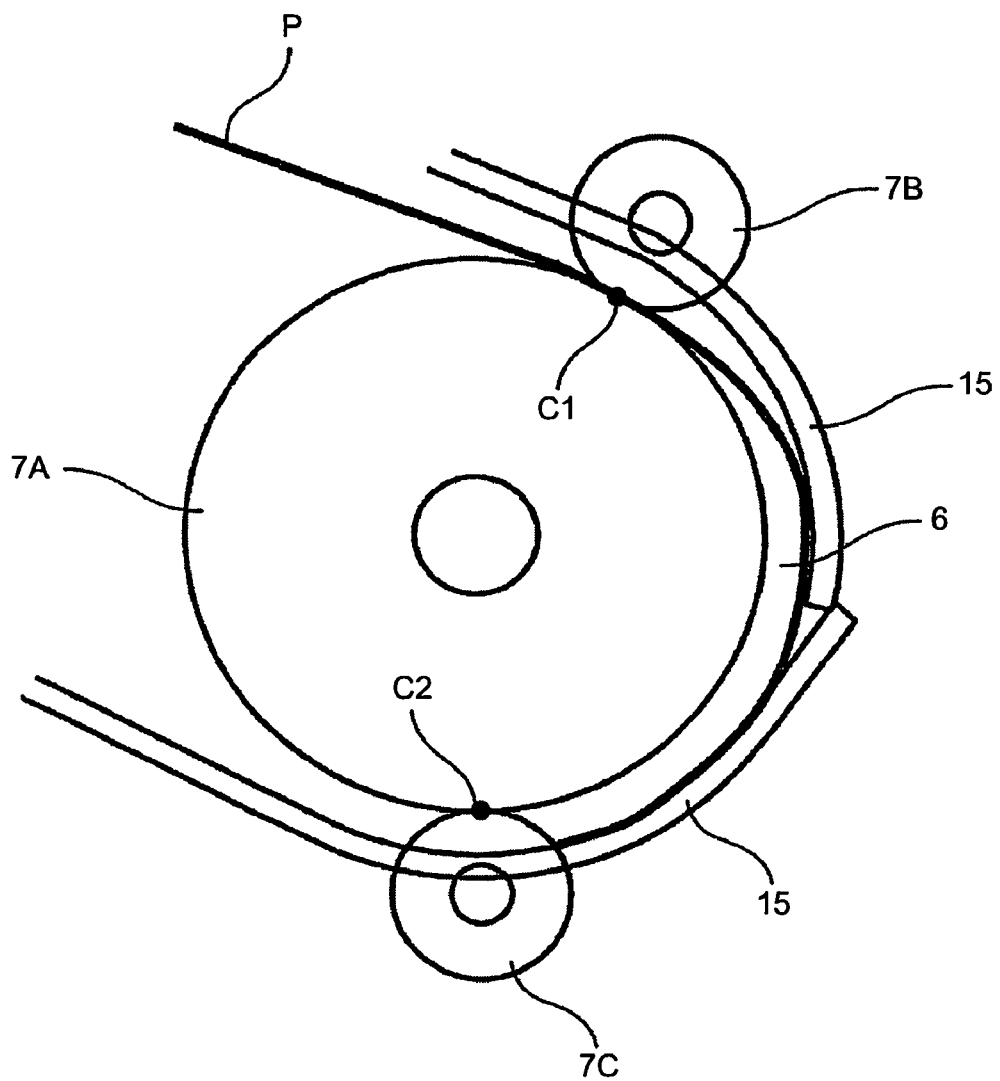
FIG. 2 is an enlarged diagram of a part circled with a dotted line II in FIG. 1.
Figure 3:
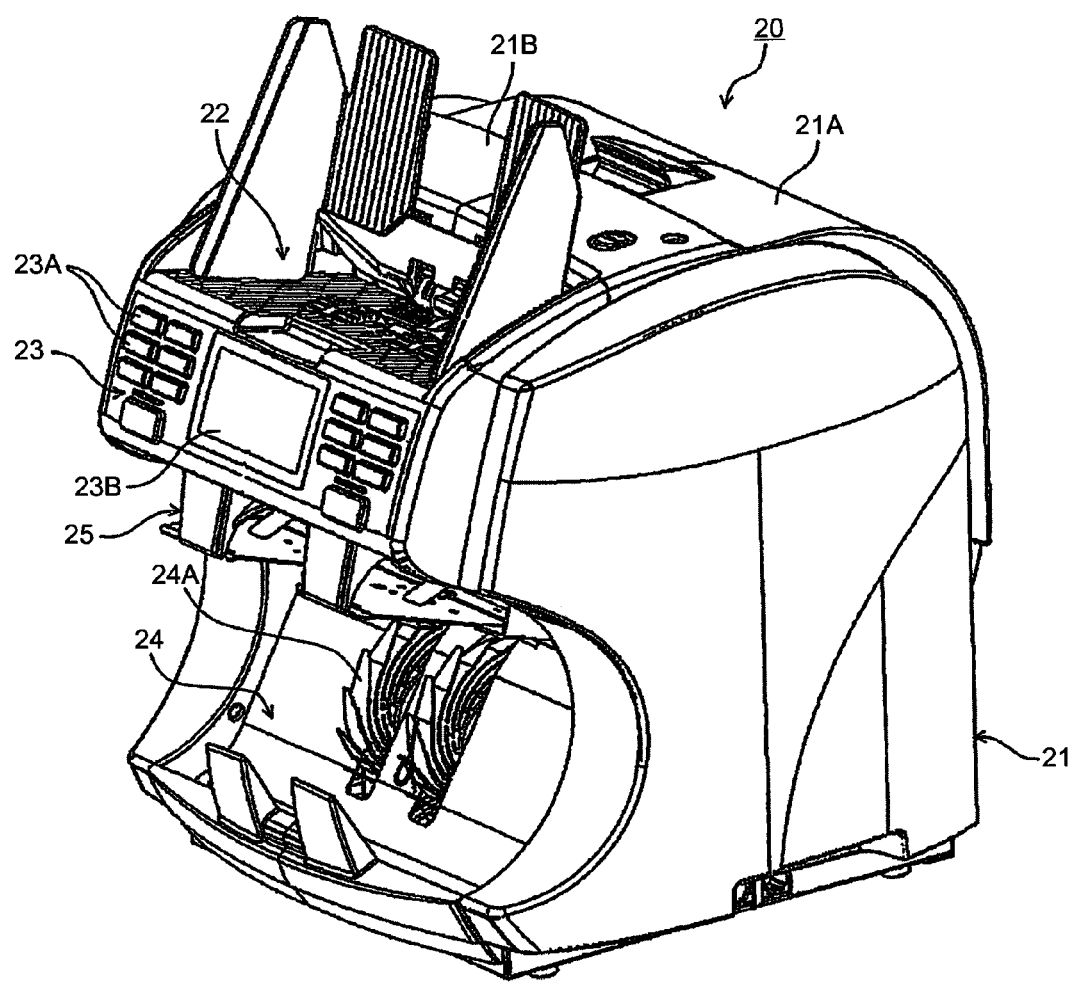
FIG. 3 is an external perspective view of a paper sheet counting apparatus according to an embodiment of the present invention.

FIG. 3 is a perspective view of an exterior of a paper sheet counting apparatus according to a first embodiment of the present invention.

In FIG. 3, a paper sheet counting apparatus 20 includes a hopper 22, onto which paper sheets such as bills are filled in a stacked state, on an upper front of a casing 21, and an operation display unit 23 that performs various setting at the time of performing a counting and recognizing process of the paper sheets and displays a processing state thereof below the hopper 22 at the front of the casing 21. The operation display unit 23 includes a plurality of operation buttons 23A for performing input of a processing operation, and a display panel 23B for displaying input information by the operation buttons 23A and a counting state, so that a bill recognizing and counting process of, for example, bills of different countries is performed by an input operation of the operation buttons 23A.

The paper sheet counting apparatus 20 also includes a stacker 24, in which the counted paper sheets are aligned and stacked, on a lower front of the casing 21, and a rejecting unit 25 in which paper sheets excluded from a counting target are stacked, above the stacker 24. A member indicated by reference character 24A is an impeller that catches the paper sheets transported to the stacker 24 to align and stack the paper sheets in the stacker 24.

Figure 4:
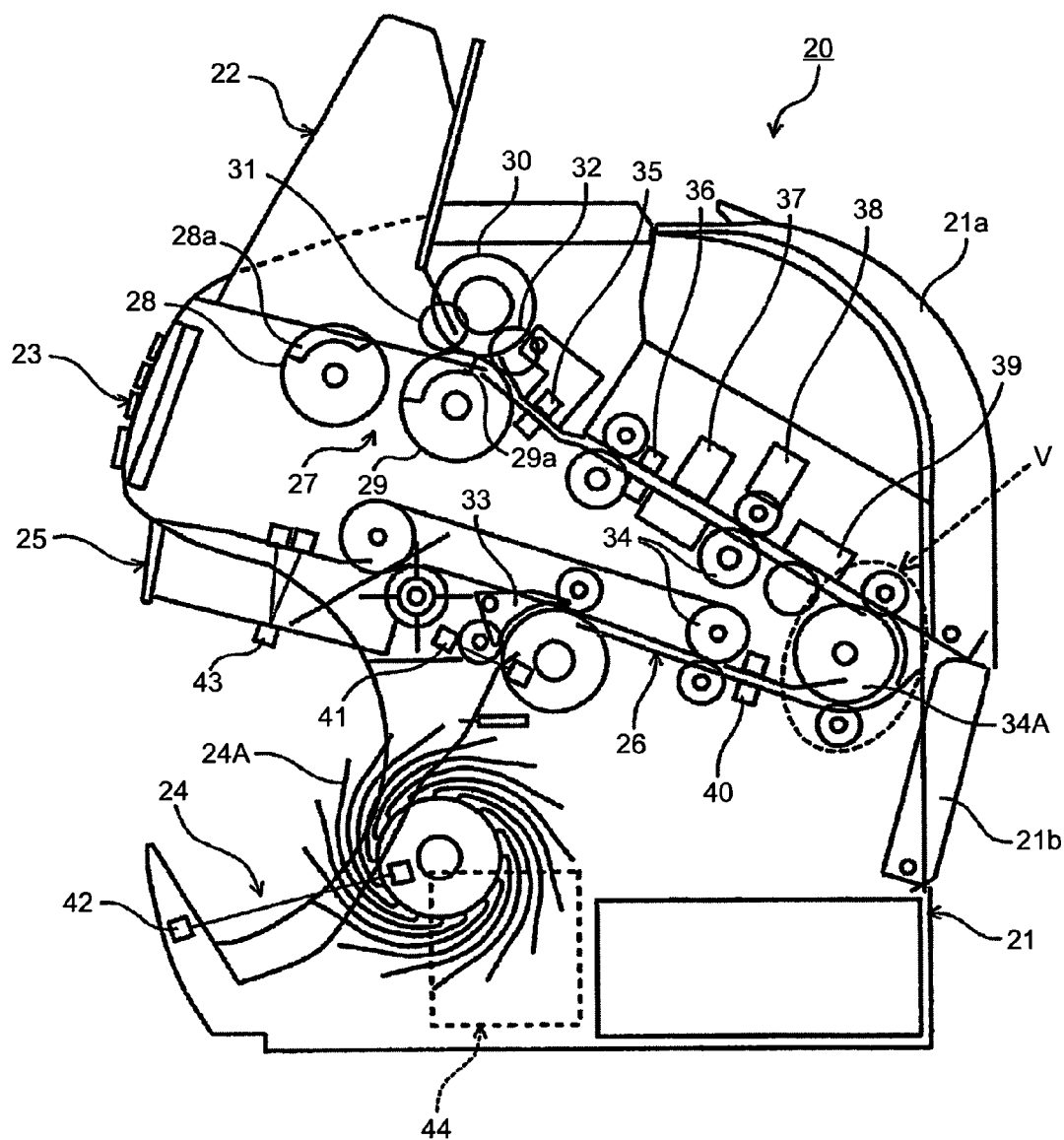
FIG. 4 is an explanatory diagram for schematically depicting a transport mechanism in the paper sheet counting apparatus according to the embodiment of the present invention.

FIG. 4 is an explanatory diagram for schematically depicting a transport mechanism in the paper sheet counting apparatus according to the embodiment of the present invention.

In FIG. 4, provided in the casing 21 of the paper sheet counting apparatus 20 is a transport mechanism that feeds the paper sheets filled in the hopper 22 to a transport path 26 one by one, and transports the paper sheets to the stacker 24 or the rejecting unit 25 along the transport path 26.

A feeding unit 27 in the transport mechanism includes a kicker roller 28 that sequentially feeds the paper sheets filled in the hopper 22 from the bottom, and a feed roller 29 that feeds the paper sheets fed from the kicker roller 28 to the transport path 26. The feeding unit 27 further includes, on an opposite side of the feed roller, a reversing roller 30 that separates individual paper sheets with the feed roller 29 and feeds each sheet, a feed assist roller 31 for assisting feed of the sheets by the kicker roller 28, and a delivery roller 32 for delivering the paper sheets having passed through between the feed roller 29 and the reversing roller 30 reliably to the transport path 26.

A part of an outer peripheral surface of the kicker roller 28 and a part of an outer peripheral surface of the feed roller 29 are made of high friction materials 28a and 29a such as rubber, respectively, and other outer peripheral surfaces thereof are slippery metal surfaces. Each of the rollers 28, 29, 30, 31, and 32 in the feed unit 27 is constituted by two rollers arranged in a pair in a widthwise direction orthogonal to a paper sheet transport direction.

The transport path 26 is directed from the feed unit 27 at an upper front of the casing 21 toward a back side (right side in FIG. 4) inside the casing 21, changes a transport direction in the turn portion, and communicates with the stacker 24 or the rejecting unit 25 provided at a lower front of the casing 21. The transport path 26 includes a flipper 33 connected to a solenoid (not shown) in a portion where the transport path 26 is branched toward the stacker 24 and the rejecting unit 25. The flipper 33 swings according to an identification result, thereby changing a route of the recognized paper sheet between a route toward the stacker 24 and a route toward the rejecting unit 25.

Arranged along the transport path 26 are a plurality of transport rollers 34 including a drive roller 34A constituting the inside of the turn portion, and the sensing unit that performs counting and recognition of the paper sheets and abnormality (such as paper jamming or skewed state) detection of a delivery state.

The sensing unit includes a first passage sensor 35, a second passage sensor 36, a line sensor 37, a double-feed detection sensor 38, a magnetic sensor 39, and a third passage sensor 40 sequentially arranged from the upstream side to the downstream side of the transport path 26, a counting sensor 41 arranged in the transport path 26 between the flipper 33 and the stacker 24, a stacker sensor 42 arranged in the stacker 24, and a reject sensor 43 arranged in the rejecting unit 25.

The line sensor 37 and the magnetic sensor 39 constitute a part of a recognizing part that performs denomination recognition and authenticity determination of the paper sheets, and the counting sensor 41 constitutes a part of a counting part that counts the number of sheets of passing normal paper sheets (paper sheets determined to be a counting target). The paper sheets determined to be a counting target by the recognizing part pass through the flipper 33 and are counted by the counting part, arranged by an impeller 24A, and then ejected to the stacker 24. On the other hand, the paper sheets excluded from the counting target by the recognizing part are delivered to the rejecting unit 25 due to downward swinging of the flipper 12 by the operation of the solenoid.

Further, the first passage sensor 35, the second passage sensor 36, the double-feed detection sensor 38, the third passage sensor 40, the stacker sensor 42, and the reject sensor 43 among the sensors in the sensing unit constitute a part of an abnormality detecting part that detects whether there is abnormality in the delivery state or a stacked state of the paper sheets. When an abnormality is detected by these sensors, a main motor 44 as a transport drive source of the paper sheet counting apparatus 20 is stopped.

The first passage sensor 35, the second passage sensor 36, and the third passage sensor 40 detect a skew degree of the paper sheets being transported and the presence of jamming. The double-feed detection sensor 38 detects whether a plurality of paper sheets are transported in a stacked state. The stacker sensor 42 and the reject sensor 43 detect the paper sheets delivered to the stacker 24 and the rejecting unit 25, respectively.

Figure 5:
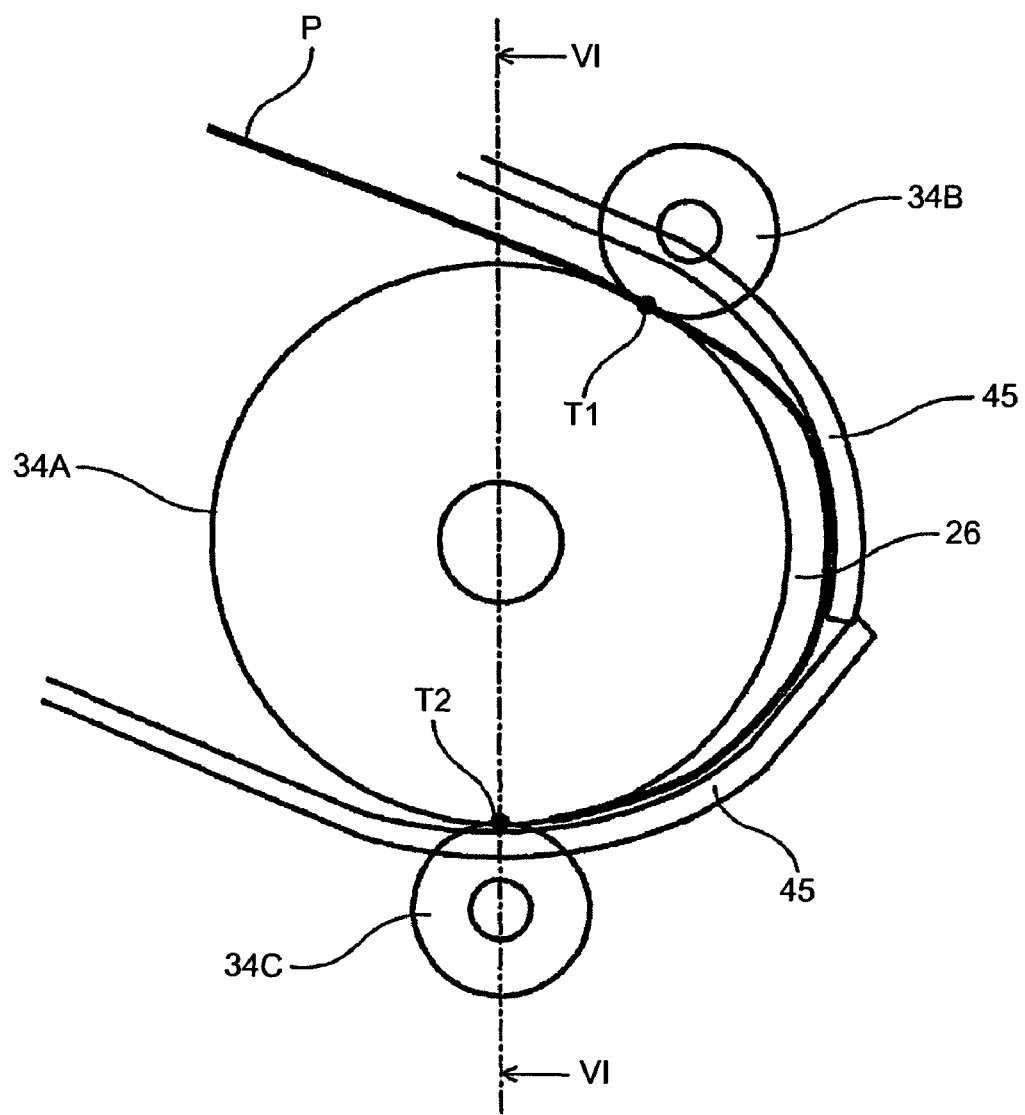
FIG. 5 is an enlarged diagram of a part circled with a dotted line V in FIG. 4 (a turn portion of a transport path)
Figure 6:
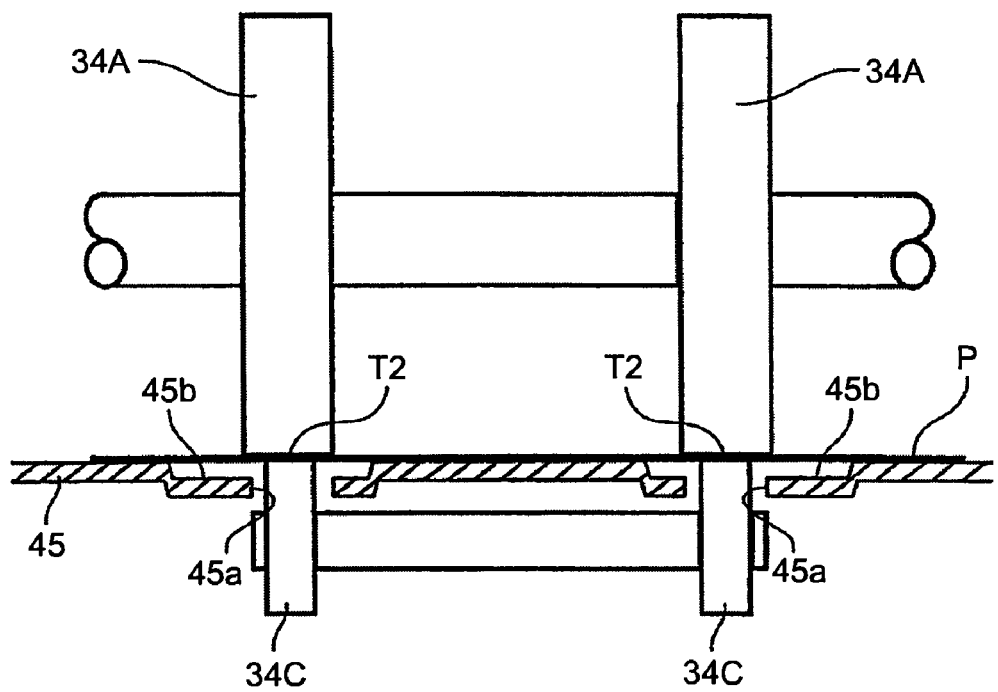
FIG. 6 is a sectional view on arrow along a line VI-VI in FIG. 5.

FIG. 5 is an enlarged diagram of a part circled with a dotted line V in FIG. 4 (the turn portion of the transport path 26), and FIG. 6 is a sectional view on arrow along a line VI-VI in FIG. 5.

In FIG. 5, the drive roller 34A is arranged inside of the turn portion of the transport path 26, and a first pinch roller 34B and a second pinch roller 34C that biases the paper sheet P passing through the turn portion against an outer peripheral surface of the drive roller 34A are provided outside of the drive roller 34A. The first pinch roller 34B is arranged to come in contact with the drive roller 34A at a turn starting point T1 of the transport path 26, and the second pinch roller 34C is arranged to come in contact with the drive roller 34A at a turn ending point T2 of the transport path 26. A turn guide plate 45 is arranged between the first pinch roller 34B and the second pinch roller 34C to guide the paper sheet P transported to the turn portion along an outer periphery of the drive roller 34A. That is, the turn portion of the transport path 26 is formed of the outer peripheral surface of the drive roller 34A and an inner peripheral surface of the turn guide plate 45.

A gap between the turn guide plate 45 and the drive roller 34A gradually decreases from the turn starting point T1 toward the turn ending point T2, and becomes slightly larger than a thickness of the passing paper sheet P at the turn ending point T2. The front edge of the paper sheet P transported to the turn portion of the transport path 26 passes through a contact portion T1 between the first pinch roller 34B and the drive roller 34A, and then travels along the inner peripheral surface of the turn guide plate 45. Therefore, the front edge of the paper sheet P having traveled along the inner peripheral surface of the turn guide plate 45 can enter into a contact portion T2 between the second pinch roller 34C and the drive roller 34A, in a state of the incident angle being substantially 0 degree. Accordingly, the running noise generated when the front edge of the paper sheet P passes the contact portion between the second pinch roller 34C and the drive roller 34A and damage of the front edge of the paper sheet can be reduced.

In the present embodiment, the two pinch rollers 34B and 34C are provided in the turn portion of the transport path. However, the present invention is not limited to this configuration, and one or a plurality of pinch rollers can be provided between the pinch rollers 34B and 34C.

Further, as shown in FIG. 6, concave portions 45b, 45b are respectively formed in the turn guide plate 45 near the contact portions T2, T2 between the second pinch rollers 34C, 34C and the drive rollers 34A, 34A, that is, near pinch roller holes 45a, 45a bored for protruding the second pinch rollers 34C, 34C from the inner peripheral surface of the turn guide plate 45. Accordingly, when the paper sheet passes through the contact areas T2, T2, possibility of the corner at the front edge of the paper sheet being caught by the pinch roller holes 45a, 45a can be reduced.

Figure 7:
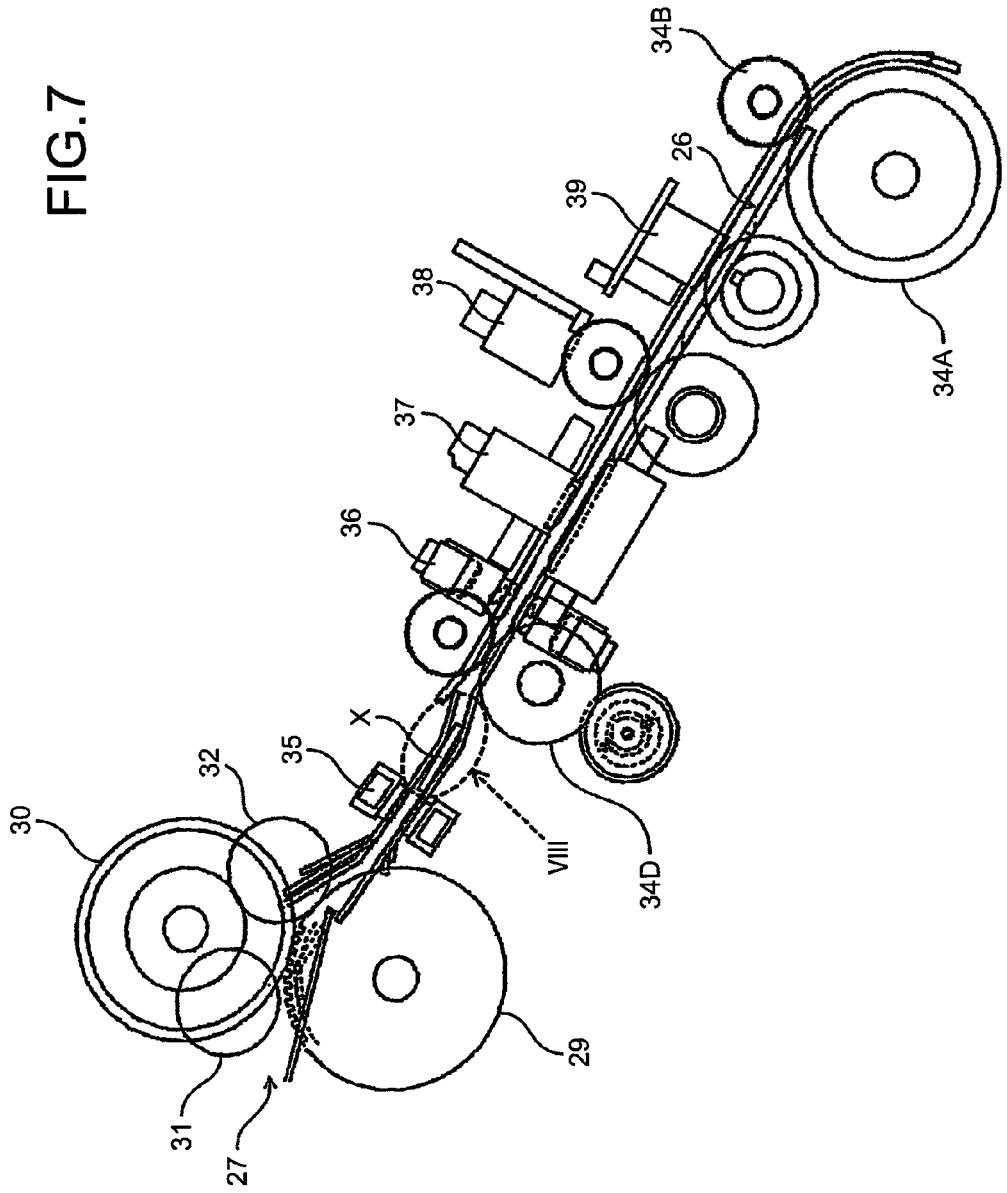
FIG. 7 is a sectional view of a main part of a transport mechanism from a feeding unit to the turn portion of the transport path of the paper sheet counting apparatus according to the present embodiment.
Figure 8:
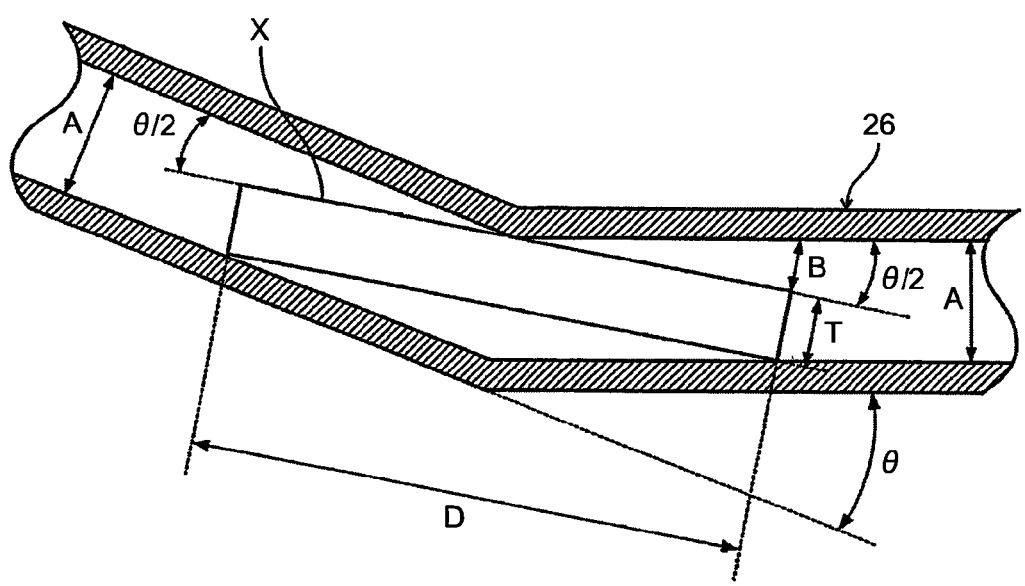
FIG. 8 is an enlarged diagram of a part circled with a dotted line VIII (a bent portion of the transport path) in FIG. 7.

FIG. 7 is a sectional view of a main part of the transport mechanism from the feeding unit 27 to the turn portion of the transport path 26 of the paper sheet counting apparatus 20 according to the present embodiment, and FIG. 8 is an enlarged diagram of a part circled with a dotted line VIII (the bent portion of the transport path 26) in FIG. 7.

In FIG. 7, the first and second passage sensors 35 and 36 that detect the skew degree and the traveling state of the paper sheets being transported are arranged on the downstream side of the feeding unit 27, and a speed-increasing roller 34D that accelerates the transported paper sheets is arranged immediately before (on the upstream side of) the second passage sensor 36. The bent portion is formed immediately before (on the upstream side of) the speed-increasing roller 34D, that is, in the transport path 26 between the first passage sensor 35 and the speed-increasing roller 34D, so that a thin and hard foreign article (a coin X) other than the paper sheets cannot pass therethrough.

As shown in FIG. 8, a relation between a height A of space and an angle of bend θ of the transport path 26 in the bent portion is defined by:

$$A \leq [T + D/2 \times \tan(\theta/2)] \times \cos(\theta/2) \quad \text{(Expression 1)}$$

where D denotes a width of the coin X in the traveling direction (diameter), and T denotes a thickness of the coin X.

For example, when the coin X is 1 cent Euro coin, which has the smallest diameter in the Euro currency, the diameter D of the coin X is 16.25 millimeters, and the thickness T of the coin X is 1.67 millimeters. When it is assumed here that the height A of space of the transport path 26 in the bent portion is 3.26 millimeters, the angle of bend (θ)=23° is obtained from the expression 1. Therefore, when the height A of space of the transport path 26 in the bent portion is 3.26 millimeters, if the angle of bend (θ) is formed to be equal to or more than 23 degrees, even if the coin used in the Euro currency enters into the transport path 26 from the feed unit 27, the coin can be stopped by the bent portion.

As described above, in the paper sheet counting apparatus 20 according to the present embodiment, the bent portion formed such that the thin and hard foreign article (the coin X or the like) other than the paper sheets cannot pass therethrough is formed in the transport path 26 on the upstream side of the sensors constituting a part of the counting part and the identifying part of the sensing unit, that is, in the transport path 26 on the upstream side of the line sensor 37 arranged on the most upstream side among the line sensor 37, the magnetic sensor 39, and the counting sensor 41. Accordingly, even if a foreign article such as the coin X is mixed in the paper sheets filled in a hopper 23 and fed to the transport path 26, the foreign article can be stopped by the bent portion provided on the upstream side of the line sensor 37. As a result, the line sensor 37 and the magnetic sensor 39, which are relatively expensive among the various sensors in the sensing unit and require high accuracy, can be prevented from being damaged. Further, by providing the bent portion on the upstream side of the line sensor 37, disturbance light entering from the entrance of the transport path 26 can be intercepted before the line sensor 37, thereby enabling to favorably maintain the accuracy of the line sensor 37 susceptible to the effect of the disturbance light.

Figure 9:
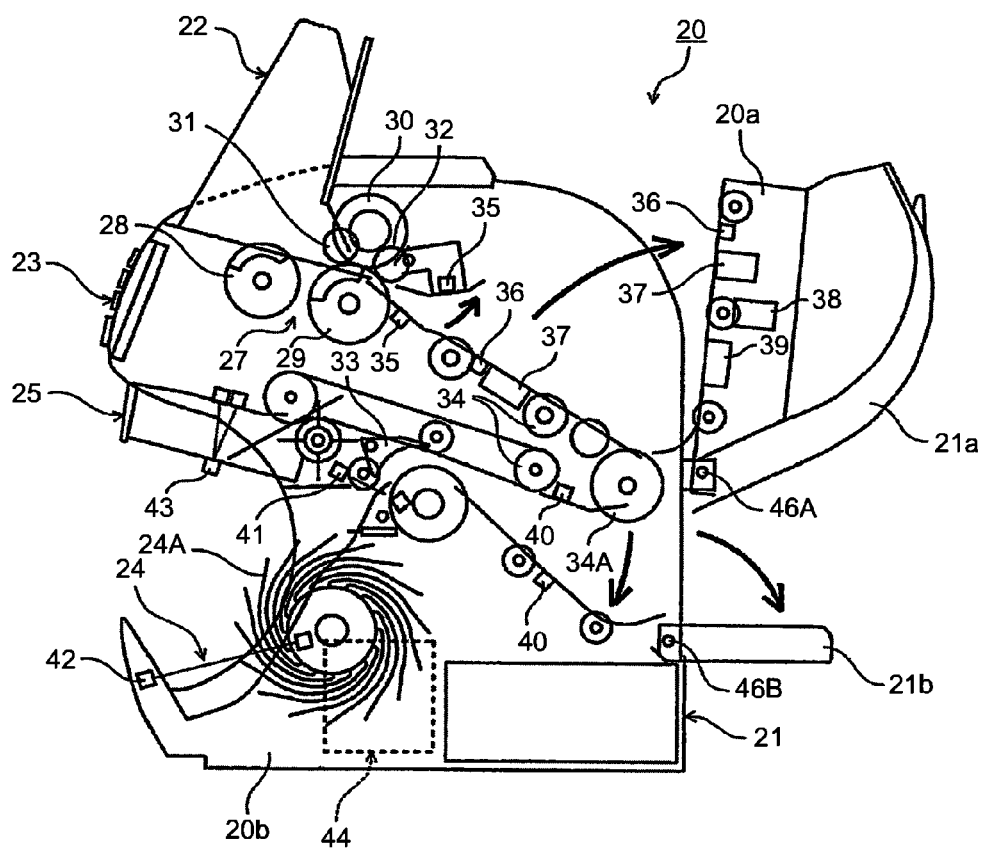
FIG. 9 is an explanatory diagram of a state with a part of the paper sheet counting apparatus shown in FIG. 4 being open.

FIG. 9 is an explanatory diagram of a state with a part of the paper sheet counting apparatus shown in FIG. 4 being open.

In FIG. 9, an upper unit 20a of the paper sheet counting apparatus 20 is provided integrally with an upper part 21a of the backside of the casing 21, and rotatably fitted to an apparatus main unit 20b via a pivot 46A provided at a proximal end of the upper part 21a of the backside of the casing 21. In the paper sheet counting apparatus 20 according to the present embodiment, when the coin X is stopped in the bent portion of the transport path 26, paper jamming due to the coin X occurs in the paper sheets transported thereafter. In such a case, this state is detected by the first passage sensor 35, and the main motor 44 as the transport drive source of the paper sheet counting apparatus 20 is stopped immediately. When the coin X and the paper sheets are jammed in the bent portion of the transport path 26, these can be removed by opening a part of the transport path 26, to which the upper unit 20a and the first passage sensor 35 are fitted, in a direction of arrow.

Further, a side 21b of the backside of the casing 21 is also fitted rotatably to the apparatus main unit 20b via a pivot 46B provided at the proximal end thereof, and the paper sheets jammed in the turn portion of the transport path 26 can be removed by opening the side 21b of the backside of the casing 21 and a lower part of the transport path 26.

While a specific example of the present invention has been explained above, the invention is not limited thereto, and can be variously modified without departing from the scope of the present invention.

INDUSTRIAL APPLICABILITY

As described above, the present invention is applicable to a paper sheet counting apparatus that receives paper sheets in a hopper, counts the number of the received paper sheets, and stacks the paper sheets in a stacker, and is useful when high transport speed of the paper sheets is to be achieved, and when a protective measure is taken with respect to the sensors in an recognizing part and a counting part.

The invention claimed is:

1. A paper sheet counting apparatus comprising:
    a hopper configured to be filled by a plurality of paper sheets in a stacked state;
    a transport mechanism configured to feed the plurality of paper sheets filled in the hopper to a transport path one by one, and configured to transport the plurality of paper sheets along the transport path;
    a sensing unit comprising at least a counting sensor for counting the plurality of paper sheets; and
    a stacker configured to be stacked with the plurality of paper sheets fed from the transport path,
    wherein the transport mechanism comprises:
        a drive roller constituting an inside of a turn portion for changing a direction of the transport path;
        a pinch roller configured to bias a given paper sheet from the plurality of paper sheets against an outer peripheral surface of the drive roller; and
        a turn guide plate configured to guide the given paper sheet along an outer periphery of the drive roller,
    wherein a gap between the turn guide plate and the drive roller decreases, along a traveling direction of the transport path, from a point where the given paper sheet is started to be transported around the outer peripheral surface of the drive roller toward a contact portion between the pinch roller and the drive roller, and
    wherein the direction of the transport path where the gap continually decreases is changed by more than 90 degrees by the drive roller and the turn guide plate.

2. The paper sheet counting apparatus according to claim 1, wherein, in a direction perpendicular to a transport direction of the given paper sheet, a cross-sectional shape of the turn guide plate includes a concave portion near the pinch roller,
    wherein the concave portion is spaced away from the given paper sheet, that is guided by the turn guide plate and is transported between the drive roller and the pinch roller, and
    wherein the concave portion is formed on a side of the pinch roller.

3. The paper sheet counting apparatus according to claim 1, further comprising another pinch roller, wherein an angle from the contact portion between the pinch roller and the drive roller to a contact portion between the another pinch roller and the drive roller is more than 90 degrees.

4. A paper sheet counting apparatus comprising:
    a hopper configured to be filled by a plurality of paper sheets in a stacked state;
    a transport mechanism configured to feed the plurality of paper sheets filled in the hopper to a transport path one by one, and configured to transport the plurality of paper sheets along the transport path;
    a sensing unit comprising at least a counting part for counting the plurality of paper sheets and a recognizing part for recognizing the plurality of paper sheets; and
    a stacker configured to be stacked with the plurality of paper sheets fed from the transport path,
    wherein the transport path includes a bent portion formed by one pair of opposing guide plates on an upstream side of the recognizing part, and
    wherein heights of spaces between the pair of opposing guide plates at sections of the transport path from upstream to downstream of the bent portion, through which the paper sheets are transported, are substantially the same.

5. The paper sheet counting apparatus according to claim 4, wherein a relation between a height A of space of the transport path in the bent portion and an angle of bend θ of the transport path in the bent portion is defined by $$A \leq [T + D/2 \times \tan(\theta/2)] \times \cos(\theta/2),\text{ and}$$

wherein D denotes a width of a foreign article in a traveling direction of the transport path, and T denotes a thickness of the foreign article.

6. The paper sheet counting apparatus according to claim 5, wherein the foreign article is a circular member, a diameter of the circular member is equal to or larger than 16.25 millimeters, and a thickness of the circular member is equal to or larger than 1.67 millimeters.

7. The paper sheet counting apparatus according to claim 4, wherein the transport path forming the bent portion is capable of being open at least in either an upward direction or a downward direction.

8. The paper sheet counting apparatus according to claim 4, wherein the pair of opposing guide plates comprises a first bent guide plate and a second bent guide plate opposing the first bent guide plate.

9. The paper sheet counting apparatus according to claim 4, wherein the bent portion is formed by the pair of opposing guide plates such that a thin and hard foreign article other than the plurality of paper sheets cannot pass therethrough.

10. The paper sheet counting apparatus according to claim 4, wherein the bent portion is formed by each of the pair of opposing guide plates being bent so as to form a substantially V-shape path therebetween.

11. A paper sheet counting apparatus comprising:
    a hopper configured to be filled by a plurality of paper sheets in a stacked state;
    a transport mechanism configured to feed the plurality of paper sheets filled in the hopper to a transport path one by one, and configured to transport the plurality of paper sheets along the transport path;
    a sensing unit comprising at least a counting part for counting the plurality of paper sheets and a recognizing part for recognizing the plurality of paper sheets; and
    a stacker configured to be stacked with the plurality of paper sheets fed from the transport path,
    wherein the transport mechanism comprises:
        a drive roller constituting an inside of a turn portion for changing a direction of the transport path;
        a plurality of pinch rollers configured to bias a given paper sheet from the plurality of paper sheets against an outer peripheral surface of the drive roller, the plurality of pinch rollers comprising a first pinch roller and a second pinch roller downstream of the first pinch roller; and
        a turn guide plate arranged between the first and second pinch rollers,
    wherein the turn guide plate is configured to guide the given paper sheet along an outer periphery of the drive roller,
    wherein the turn guide plate is formed such that a front edge of the given paper sheet transported to the turn portion is guided to a contact portion between the second pinch roller and the drive roller,
    wherein a gap between the turn guide plate and the drive roller at the turn portion gradually decreases from a turn starting point toward a turn end point,
    wherein the transport path includes a bent portion formed by at least one guide plate on an upstream side of the recognizing part, and
    wherein the bent portion is formed substantially V-shaped such that a thin and hard foreign article other than the plurality of paper sheets cannot pass therethrough.

12. The paper sheet counting apparatus according to claim 11, wherein a relation between a height A of space of the transport path in the bent portion and an angle of bend θ of the transport path in the bent portion is defined by $$A \leq [T+D/2 \times \tan(\theta/2)] \times \cos(\theta/2), \text{ and}$$

wherein D denotes a width of the foreign article in a traveling direction of the transport path, and T denotes a thickness of the foreign article.

13. The paper sheet counting apparatus according to claim 11, wherein the foreign article is a circular member, a diameter of the circular member is equal to or larger than 16.25 millimeters, and a thickness of the circular member is equal to or larger than 1.67 millimeters.

14. The paper sheet counting apparatus according to claim 11, wherein the transport path forming the bent portion is capable of being open at least in either an upward direction or a downward direction.

15. The paper sheet counting apparatus according to claim 11, wherein the at least one guide plate forming the bent portion comprises a first bent guide plate and a second bent guide plate opposing the first bent guide plate.

* * * * *